April 20, 1965 E. UMBRICHT 3,179,387
GAS WASHING APPARATUS
Original Filed Oct. 8, 1956 3 Sheets-Sheet 1

INVENTOR
EMIL UMBRICHT
BY
Curtis, Morris & Safford
ATTORNEYS

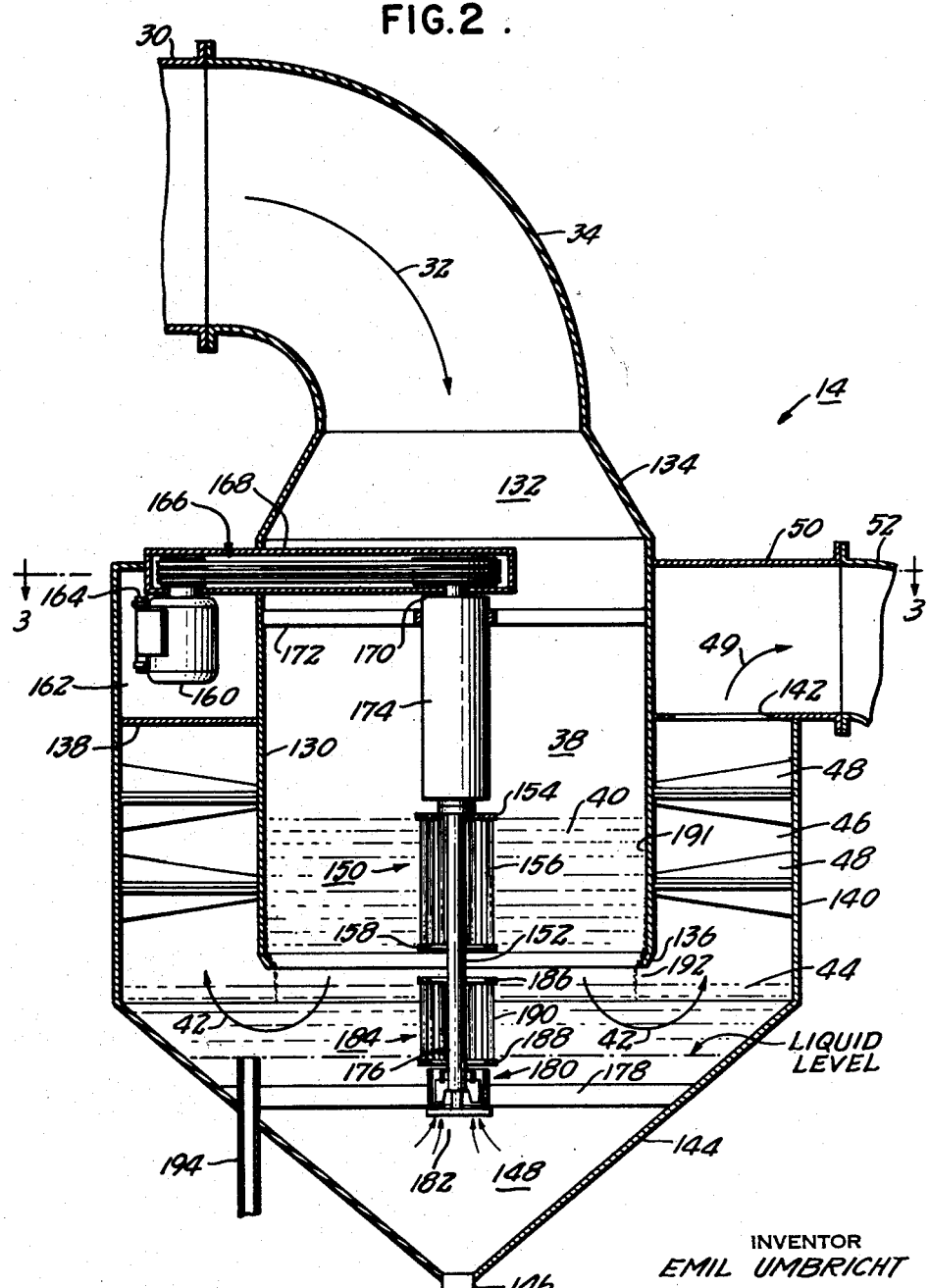

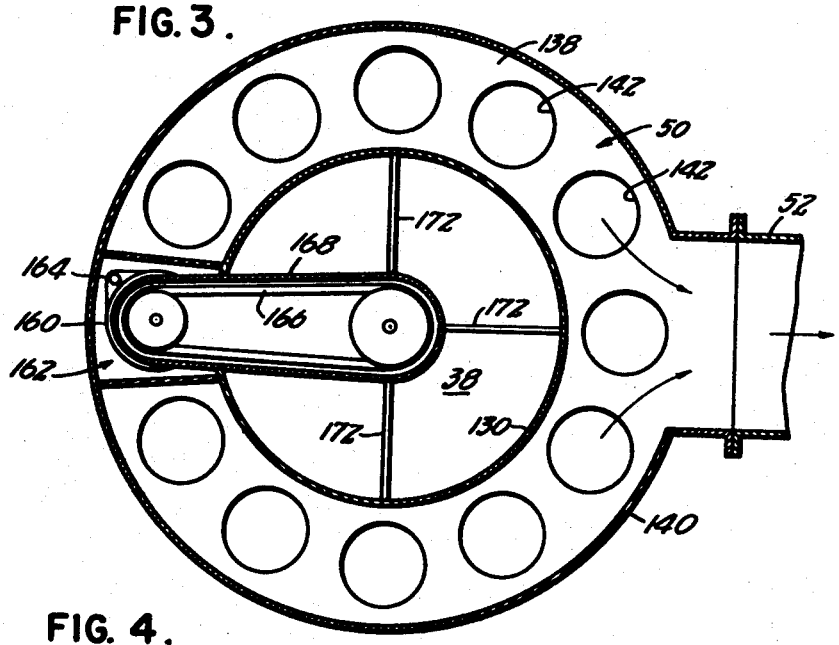
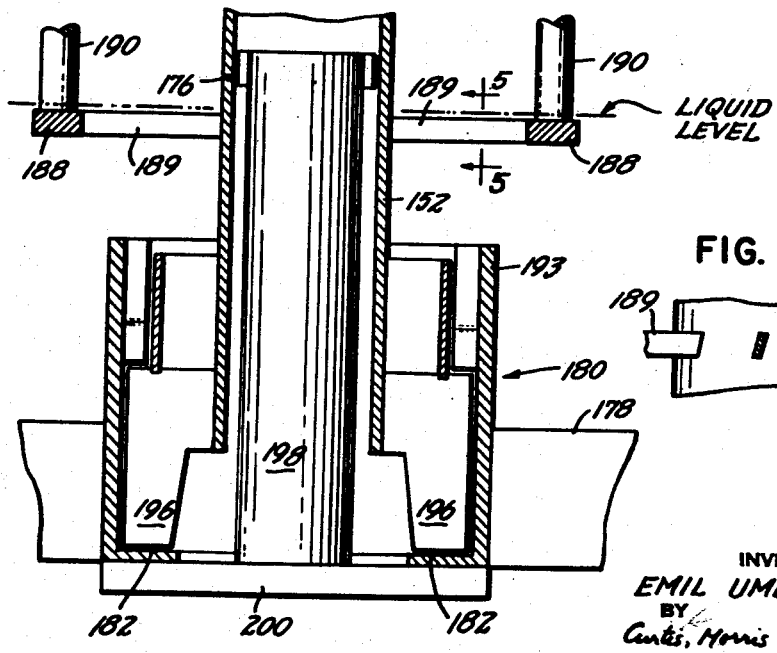
INVENTOR
EMIL UMBRICHT

United States Patent Office 3,179,387
Patented Apr. 20, 1965

3,179,387
GAS WASHING APPARATUS
Emil Umbricht, Jackson, Mich., assignor to Ajem Laboratories, Inc., Livonia, Mich., a corporation of Michigan
Original application Oct. 8, 1956, Ser. No. 614,566, now Patent No. 2,940,733, dated June 14, 1960. Divided and this application Sept. 17, 1959, Ser. No. 846,224
1 Claim. (Cl. 261—36)

The present invention relates to improved systems for cleaning contaminated gases. More particularly, this invention relates to improved gas washing systems capable of handling large volumes of rapidly moving gases containing in suspension substantial amounts of particles of various sizes. This improved apparatus described as an illustrative embodiment of the invention is particularly well suited for use in industrial installations wherein the incoming velocity of these gases is high and the gases must be passed through the apparatus at a rapid rate while at the same time a high efficiency is obtained in the extraction of the particles from the gases.

The illustrative embodiment of this invention described in detail in this specification is well suited for use in the most difficult and rugged installations. This apparatus is well suited for handling the large volumes of gases containing large amounts of suspended solid particles which are discharged from various industrial furnaces, for example, such as metal treating furnaces. In the illustrative embodiment of this invention described herein the furnace from which the contaminated gases are being discharged is a cupola furnace of the type used in large iron and steel foundries. The improved washing apparatus described herein for cleaning the gases prior to discharge into the air is of the type wherein the gases to be washed are passed through a dense spray of washing liquid created by a centrifugal type spray generating cage positioned near the center of a gas-washing chamber.

The washing operation is carried on rapidly and obtains a substantially complete removal of all of the particles from the gases prior to their discharge into the atmosphere.

In various industries today, there are many different types of high temperature furnaces that discharge gases which must be cooled and cleaned before being discharged into the atmosphere. Good examples of these are the cupola furnaces, which discharge large volumes of gases at relatively high temperatures heavily loaded with solid particles of all sizes. These particles range in size from small clinkers to ultra-microscopic particles of fly ash, carbon and finely divided iron and iron oxide and other oxides. Along with these particles are often discharged considerable quantities of carbon monoxide which must be burned to prevent explosion during the cooling and washing. This burning of the carbon monoxide usually occurs at the top of the cupola furnace, but in many cases the flaming gas continues over into the short side ducts which carry the gases and solid particles directly to the heat exchanger. As a result, gases reaching the heat exchanger described herein are usually of a temperature near 1500 F.

In the operation of a cupola furnace such as described, it is most desirable for efficient operation that the fresh air being fed into the intake at the bottom of the furnace should be heated up to a relatively high temperature. The hot gases coming from the top of the furnace in being cooled down are used to preheat the fresh intake air before it is fed into the bottom of the furnace. The improved heat exchanger system described herein is rugged in construction and easy to maintain and is highly effective in producing the desired cooling of the exhaust gases and in warming up the fresh intake air, as described and claimed in application Serial No. 614,566, filed October 8, 1956 and now Patent No. 2,940,733, of which this present application is a division.

There is also another reason why it is desirable to cool down the gases being discharged. In their heated state they are expanded up to two or three times their volume at atmospheric temperatures. This increased volume makes it very difficult to handle, process and clean the gases. By cooling them down as quickly and efficiently as possible, their volume is reduced sharply and they are rendered easier to wash.

A third reason it is desirable to extract as much heat as possible from the cupola gases is that their high temperature tends to deteriorate rapidly the equipment used in handling the gases. In certain instances parts of the prior types of equipment have been known to expand and buckle, to rust and burn through, because of the extremely high temperatures present in the exhaust gases from the cupola furnace.

The improved gas washing apparatus described herein is particularly well suited for receiving the cooled gases from the heat exchanger. Among the advantages of this improved gas washing apparatus are those resulting from the fact that the incoming gas is enabled to be blown downwardly directly into the gas washing chamber in the center of the apparatus. Thus, the heavier particles are hurled down through the gas washing chamber and automatically become trapped in the washing liquid bath at the bottom. A very favorable uniform distribution of the intake gases occurs because they flow directly down into the unit without any requirement for abrupt reversal of direction near the entrance. Any tendency for the gas-borne particles to accumulate or coat over any of the surfaces near the entrance to the washer is substantially eliminated by the smooth rapid downward flow obtained.

A further advantage is that substantially all of the washing action occurs as the incoming gases are passing downwardly through the apparatus. Thus, the droplets of washing liquid are more readily removed for the gases, after being washed, are abruptly reversed in direction, passing upwardly through a large annular moisture elimination compartment. A sudden deceleration in the gases occurs as they pass upwardly in this chamber and into the baffles, and substantially all of the moisture is advantageously removed from the gas.

Also, the moisture eliminator or baffle compartment has an annular form of a much larger cross sectional area than that in the washing chamber resulting in a relatively slower flow of the washed gases therethrough. The overall operation of the washer provides increased efficiency and a reduced amount of maintenance is necessary.

The various aspects, features, objects and advantages of the present invention will be more fully understood from a consideration of the following description in conjunction with the accompanying drawings, in which:

FIGURE 2 is an elevational axial section view of the improved air washing apparatus embodying the present invention;

FIGURE 3 is a cross sectional view of the improved air washing apparatus taken along the line 3—3 shown in FIGURE 2 looking downwardly;

FIGURE 4 is a cross sectional view, on enlarged scale, showing the liquid elevating pump at the lower end of the drive shaft; and FIGURE 5 is a partial sectional view along the line 5—5 in FIGURE 4.

Figure 1:
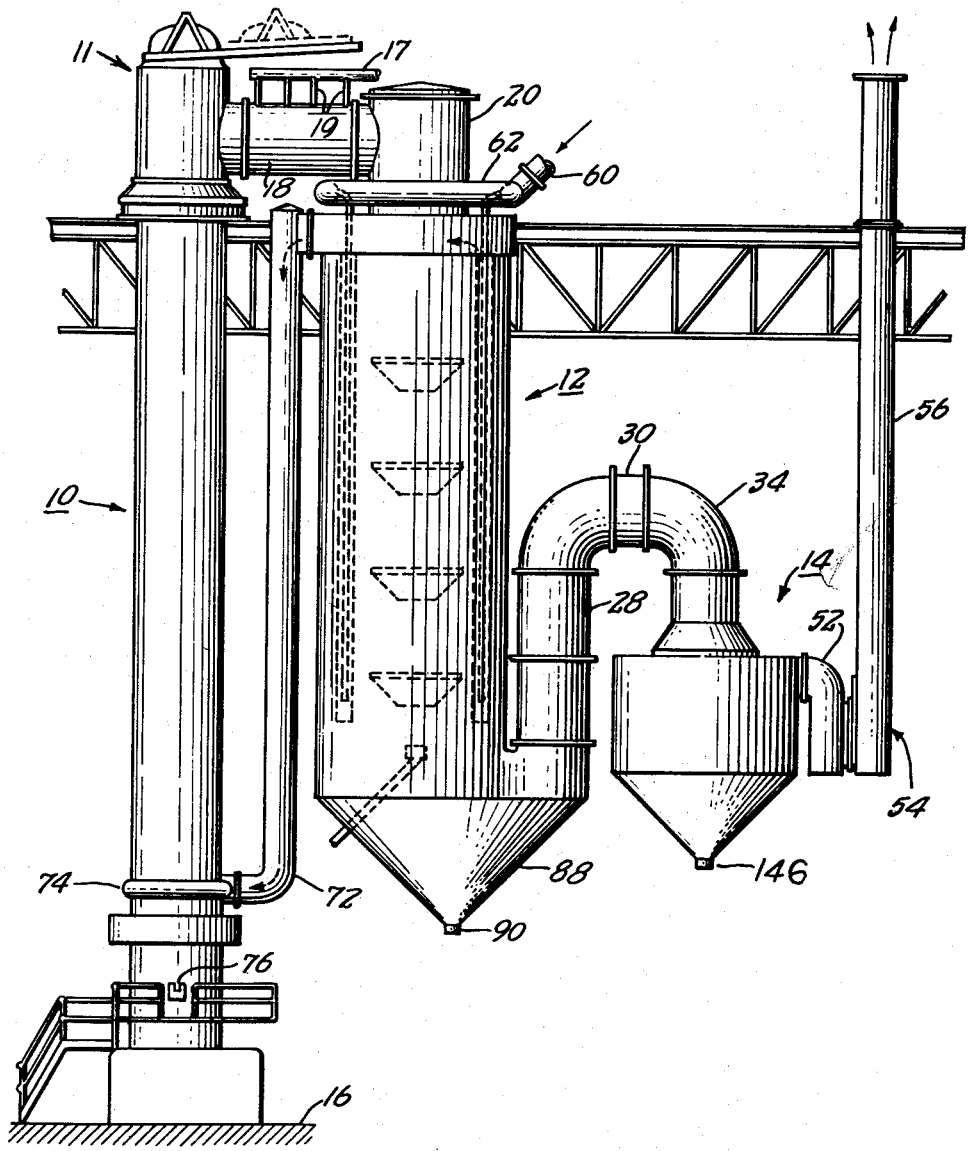
FIGURE 1 is an elevational view showing at the left a cupola furnace; an improved heat exchanger, as claimed in said application S.N. 614,566, is shown near the center of the drawing; and at the right is illustrated an improved gas washing apparatus discharging into a vertical stack at the extreme right.

*General description of the improved heat exchange system for cooling and cleaning gas and its operation*

Referring to FIGURE 1 in greater detail, it is to be understood that the relative sizes, proportions, and arrangement of the cupola furnace, generally indicated at 10, the improved heat exchanger, generally indicated at 12, and the improved gas washing apparatus, generally indicated at 14, is exemplary of and in general correspondence with those of a modern installation embodying the present invention. However, in order to make the operation more clear and to emphasize the features of the present invention, much of the accessory equipment surrounding the cupola furnace has been omitted for purposes of clarity. For example, such equipment as coke and limestone hoppers, travelling cranes, railroad tracks and various chutes and pipes and trusses for the operation of the equipment are not included in this drawing. This drawing illustrates an installation in which the top of the cupola furnace at 11 is more than 90 feet above the floor level as shown at the lower left at 16.

In operation, the cupola furnace 10 is charged and as the metal is being melted the gaseous by-products usually including burning carbon monoxide, and vast quantities of solid particles ranging from ultra-microscopic size up to the size of small clinkers rise up from the body of the furnace into the top and are discharged through a short convenient and rugged horizontal intake duct 18 directly into the top 20 of the heat exchanger 12. In certain installations an initial reduction in temperature is obtained in the duct 18 by supplying cooling water through a manifold 17 and feeding the water to a number of pipes 19 connected to a series of spray nozzles directed into the interior of the duct 18. It is to be noted how conveniently this heat exchanger 12 is positioned adjacent to the cupola furnace and that it enables the utilization of a relatively short straight duct to feed the hot gases and particles into the top of the heat exchanger.

These hot gases pass down through the body of the heat exchanger. When these gases reach the bottom of the heat exchanger, they make an abrupt turn, shown at 24 and pass up through an exchanger discharge duct 28. These cool gases pass over through a short coupling duct 30 directly into a sweepingly curved washer intake manifold 34 leading directly down into a circular central gas washing chamber 38 of the gas washing apparatus 14.

After passing through the dense spray 40 of washing liquid in the chamber 38, the washed gases sweep down as shown at 42 through an additional high velocity spray 44 of denser and larger droplets for scavenging the smaller droplets. The washed gases then pass up through an annular moisture eliminator plenum chamber 46 including suitable moisture eliminating baffles 48. As shown by the arrow 49, the dried gases flow into an annular outlet manifold 50 surrounding the washing chamber 38 above the annular chamber 46. From the outlet manifold 50 the gases pass over through an outlet duct 52 into a large capacity centrifugal type pump, generally indicated at 54, and are discharged up the stack 56 into the atmosphere with substantially all of the particles of whatever size removed therefrom.

The improved air washer shown in FIGURE 3 is very effective in cleaning many different types of contaminating particles from gases. For example, this apparatus is used to advantage in numerous industrial applications in removing from the air such various types of both liquid and solid particles as occur in smoke, scarfing dust, the compounds and dust from buffing operations, ferrous and non-ferrous metal grindings, particles from shot peening work, paint droplets and particles from paint spray operations, and this apparatus is very effective in removing various chemical fumes from the air, such as those over electro-plating baths.

A very high efficiency and effectiveness is obtained with this gas washing apparatus coupled to the heat exchange apparatus described above. This improved gas washing apparatus includes an inner cylindrical wall 130 open at the top and connected to the mouth of a diverging intake chamber 132 defined by a truncated conical wall 134 connected at its upper end to the gradually curved intake manifold 34. The lower end of the inner cylindrical wall 130 has a short converging lip 136 and opens down near the dense scavenging spray 44. Surrounding the inner cylindrical wall 130 and spaced therefrom by a horizontal annular partition 138 is an outer cylindrical wall 140. The partition 138 is pierced by a number of outlet ports 142 interconnecting the annular plenum chamber 46 with the outlet manifold 50.

At the lower end of the outer wall 140 is a sludge collection cone 144 which forms the bottom of the gas washer and is connected down into a 6 inch diameter flush out drain pipe 146. In this collection cone 144 is a reservoir 148 of gas washing liquid with a level as shown spaced a substantial distance below the lower lip 136. The spacing of the liquid level below the lip 136 is generally commensurate with the spacing between the inner and outer walls 130 and 140, respectively.

The washing liquid which may be used and which I find to be highly effective in its cleaning of the gases is an aqueous solution containing wetting agents, foam inhibiting agents and corrosion inhibitors. In certain applications water is used to advantage without the use of some or all of these additives, depending upon the conditions of the exhaust gases and the contaminating agents present.

This gas washer provides many advantages. Among these advantages are those resulting from the fact that the incoming contaminated gases blow directly down and into the gas washing chamber without encountering any abrupt changes in flow pattern. In the diverging intake chamber 132 the walls recede from the contaminated gases and face downwardly at an angle affording little opportunity for the solid particles to build up any deposits on the wall 134. In this intake chamber the gases are slowed down somewhat by the increase in cross sectional area and then flow directly into the gas washing chamber 38 at a desirably fast rate. Thus, a substantially uniform distribution in the flow pattern of the gases through the gas washing chamber 38 is obtained. The gas velocity at all points is substantially equal providing good conditions for efficient gas washing.

The larger clinker-size particles are hurled straight down through the washing spray 40 onto the surface of the reservoir 148 where they are trapped and removed from the gases being washed. Medium size and smaller particles are struck with the uniform, very high speed and dense spray 40 radiating outwardly horizontally from a rapidly rotating spray-generating cage 150. This cage is concentric with the wall 130 of the gas washing chamber and is secured to a vertical drive shaft 152. The cage includes a top disk 154 secured to the shaft with uniformly spaced vertical rods 156 extending down from its perimeter and are held rigidly spaced from each other at their lower ends by a ring 158 seen in section. Washing liquid is projected rapidly up into this cage through the opening in the ring 158, as explained below. This liquid strikes the underside of the rapidly rotating disk 154 and is struck by the rapidly revolving rods 156 and is flung out to form the high-speed spray 40. This spray has droplets of substantially uniform size moving outwardly at very high speed and thoroughly scrubs and cleans the gases. The spray 40 sweeps out the contaminating particles and carries them over onto the inner surface of the wall 130. The liquid from the spray 40 cascades down the inner surface of the wall 130 and flushes down all of the agglomerated particles as indicated at 191. This dirty washing liquid cascades down past the lip 136 which advantageously deflects it inwardly so as to form a curtain 192 which advantageously resists the gas flow 42. And then the curtain 192 penetrates and is caught by the scavenging spray 44. A highly efficient cleaning action occurs in chamber 38 by virtue of the uniform gas flow distribution and the dense uniform spray and the other advantageous factors discussed above.

In order to turn the shaft 152, a powerful electric motor, for example, such as a three-phase induction motor 160 having a rating in the range, for example, from one hundred to several hundred H.P. is used. This motor is shown as being mounted in a box-like compartment 162 formed at the height of the outlet manifold opposite the outlet duct 52. In certain installations it is desirable to mount the motor 160 on a suitable support outside of the outer wall 140 and to utilize the space 162 for added gas flow capacity. This motor is shown mounted by means of a vertical pivot 164 so that its position can be adjusted to tension properly the multiple V-belt drive 166 which runs over through a narrow housing 168 to driven pulleys secured to the upper end of the shaft 152.

At its upper end the shaft 152 is supported in a bearing 170 held by several radial braces 172 extending out to the inner wall 130. A cylindrical casing 174 surrounds the bearing 170 and extends down to a position closely above the top of the cage 150.

At its lower end the shaft 152 is supported in a second bearing 176 which is located within the bore in the lower end of the drive shaft 152 and above the liquid level in the reservoir and held by braces 178 extending out to the cone 144, as described in detail hereinafter.

In order to throw the liquid up into the upper cage 150 a submerged pump 180 sucks the liquid up through its annular intake 182 and propels large quantities of this liquid vertically up along the shaft 152 and in through the ring 158.

A second spray-generating cage 184 is secured to the shaft 152 just above the top or discharge end of the pump 180. This second cage includes top and bottom rings 186 and 188 each held to the shaft by a plurality of spokes, thus leaving numerous large openings up through which the liquid is propelled into the upper cage. A number of uniformly spaced vertical rods 190 extend vertically between these latter rings. The lower ring 188 and a small portion of the bottom end of each rod 190, for example, such as the lowest two inches of the rods, are below the liquid level. Large quantities of liquid are also fed up into the cage 184 by the pump 180 so as to be struck by the rods 190 and broken up into a dense scavenging spray 44 of somewhat larger droplets than in the spray 40. In addition to the liquid propelled up by the pump, the submerged ring 188 and lower portions of the rods 190 create vast quantities of a dense spray also of larger droplets which merge into and augment the scavenging spray 44 coming from the upper portions of the rods 190.

The larger droplets in this scavenging spray advantageously entrap any fine liquid droplets which otherwise might tend to blow out of the apparatus along with the gas stream 42. By virtue of the curtain of liquid 192 intersecting and penetrating the scavenging spray 44, the gas flow 42 is forced at all points into intimate contact with the scavenging spray, both as the gas initially flows downwardly inside of the curtain 192 and then as it flows up outside of this curtain 192 through the spray 44 into the moisture eliminator plenum chamber 46. The liquid from the spray 44 and curtain 192 runs down the inner wall of the cone 144.

In many cases it is desirable to maintain a continued flush out action in the reservoir 148 by means of an upwardly directed nozzle in the center of the drain pipe 146 as shown in detail and claimed in my copending application Serial No. 399,438, filed December 21, 1953, which matured into United States Patent No. 3,011,769. The desired liquid level in the reservoir is maintained by a suitable overflow pipe 194 leading down into a settling tank (not shown) to which the pipe 146 is also connected.

This gas washing apparatus is adapted to handle large quantities of gases rapidly and efficiently, for example, the volume of gas may range from 75,000 to 90,000 cubic feet per minute.

The cages 150 and 184 are approximately 18 inches in diameter and are each approximately 2 feet long, the upper cage being shown approximately 30% longer than the lower cage. The drive shaft 152 is turned at approximately 800 r.p.m.

As illustrated in FIGURES 4 and 5 the ring 188 for the lower cage is supported by spokes 189 which are inclined at an angle to the horizontal in the range from 20° to 85° depending upon the cage diameter, speed of the shaft 152, and the vertical velocity of the liquid ejected up by the pump 180. With the cage diameter and 800 r.p.m. described above, the angle of 75° is advantageous.

The ring 186 at the upper end of the lower cage is supported by inclined vane spokes similar to the spokes 189 for the lower ring. In certain installations, for example, where a higher shaft speed is used, similar inclined vane spokes also are used for the ring 158.

These sets of inclined vane spokes form propellers which accelerate the liquid up into the lower cage and up through the lower cage into the upper cage.

The pump 180 includes a cylindrical casing 193 and a hub structure 194. Impeller vanes 196 project out from the hub and have their outer edges closely adjacent to the inner surface of the casing 193. These vanes impel the liquid up into the spray-generating cases at a rapid rate in a large volume. A pump such as that described in U.S. Patent No. 2,599,202 may be used. The liquid is distributed along the rods 190 and 156, producing uniform and dense spray patterns in the regions 40 and 44. The various sets of inclined vane spokes, such as the inclined vane spokes 189 give a further boosting action to these large volumes of upwardly travelling liquid.

The lower bearing 176 is supported on a fixed central shaft 198 projecting up into the gun-bored lower end of the drive shaft 152 to a height above the liquid level. A plurality of radial braces 200 extending across the intake support the shaft 198.

As the gas moves up through the plenum chamber 46 its velocity is slower because of the increased cross sectional area, reducing any tendency to carry out fine droplets of the liquid. In passing through the sets of moisture eliminator baffles, further traces of the droplets are removed.

In a particular gas washing machine as shown in FIGURE 2 the gas washing chamber 38 has a diameter of 9 feet, yielding a cross sectional area of about 64 square feet. The outer wall 140 has a diameter of 15.5 feet, thus giving a net cross sectional area for the plenum chamber 46 of about 125 square feet, or just about twice that of the gas washing chamber. Thus, the upward velocity in the moisture eliminating chamber is only about one-half that of the down draft in the gas washing chamber.

From the foregoing it will be understood that the embodiment of the present invention described above is well suited to provide the many advantages set forth, and since different embodiments may be made of this invention and as the apparatus herein described may be varied in various parts, all without departing from the scope of the invention, it is to be understood that all matter hereinbefore set forth or shown in the accompanying drawings in to be interpreted as illustrative and not in a limiting sense and that in certain instances, some of the features of the invention may be used without a corresponding use of other features, or without departing from the scope of the invention.

I claim:

Power-washing apparatus including walls defining a washing chamber, means defining a liquid reservoir below said chamber having washing liquid therein, a rotatable shaft extending upright in said chamber, motor means connected to said shaft for rotating the shaft, first and second rotatable spray-generating cages secured to said shaft, said first cage including a top disk secured to said shaft, a plurality of rod-like elements projecting downwardly from the perimeter of said disk, first ring means around said shaft below said disk and secured to said rod-like elements, a first plurality of inclined vane spokes extending out from said shaft to said first ring, said second cage including a second ring around said shaft below said first ring, a second plurality of rod-like elements extending upwardly from said second ring, a second plurality of inclined vane spokes extending from said shaft out to said second ring, and pump means communicating with the liquid in said reservoir and discharging liquid upwardly toward the annular space between said second ring and said shaft, said second inclined vane spokes impelling said liquid upwardly into said second cage and also up through said second cage into said first cage, and said first inclined vane spokes impelling liquid upwardly into said first cage.

References Cited by the Examiner

UNITED STATES PATENTS

| | | | |
|---|---|---|---|
| 1,952,269 | 3/34 | Lundquist. | |
| 1,963,122 | 6/34 | Fagergren | 259—96 X |
| 2,254,600 | 9/41 | Ditto | 261—36 X |
| 2,573,521 | 10/51 | Wosley et al. | 261—93 |
| 2,599,202 | 6/52 | Schimpke | 261—91 |
| 2,621,754 | 12/52 | Doyle | 261—119 X |
| 2,767,965 | 10/56 | Daman | 261—87 |
| 2,796,241 | 6/57 | Lhota | 261—24 |
| 2,805,844 | 9/57 | McMaster | 261—88 X |
| 2,889,005 | 6/59 | Umbricht | 261—89 X |

NORMAN YUDKOFF, *Primary Examiner.*

HERBERT L. MARTIN, GEORGE D. MITCHELL, HARRY B. THORNTON, *Examiners.*

UNITED STATES PATENT OFFICE
CERTIFICATE OF CORRECTION

Patent No. 3,179,387                                  April 20, 1965

Emil Umbricht

It is hereby certified that error appears in the above numbered patent requiring correction and that the said Letters Patent should read as corrected below.

In the drawings, FIG. 2, the lower left area, for the numeral "194" read -- 149 --; column 3, line 64, for "3" read -- 2 --; column 4, line 20, after "level" insert -- maintained by an overflow pipe 149 --; column 6, line 28, strike out "194"; same column 6, line 67, for "in", first occurrence, read -- is --.

Signed and sealed this 30th day of November 1965.

(SEAL)
Attest:

ERNEST W. SWIDER                                EDWARD J. BRENNER
Attesting Officer                                   Commissioner of Patents